(12) United States Patent
Asai

(10) Patent No.: US 6,813,455 B2
(45) Date of Patent: Nov. 2, 2004

(54) DOUBLE-SIDED PRINTING DEVICE AND METHOD, IMAGE FORMING APPARATUS AND CONTROL METHOD THEREFOR, AND STORAGE MEDIUM

(75) Inventor: Hidehiko Asai, Kanagawa (JP)

(73) Assignee: Canon Kabushiki Kaisha (JP)

( * ) Notice: Subject to any disclaimer, the term of this patent is extended or adjusted under 35 U.S.C. 154(b) by 142 days.

(21) Appl. No.: 10/213,274

(22) Filed: Aug. 6, 2002

(65) Prior Publication Data

US 2003/0053816 A1 Mar. 20, 2003

(30) Foreign Application Priority Data

Aug. 6, 2001 (JP) .................................... 2001-237944

(51) Int. Cl.$^7$ ................................................ G03G 15/00
(52) U.S. Cl. ........................ 399/82; 399/45; 399/85
(58) Field of Search ........................ 399/45, 82, 85, 399/364

(56) References Cited

U.S. PATENT DOCUMENTS

| | | | | |
|---|---|---|---|---|
| 4,468,114 A | * | 8/1984 | Pels et al. | 399/364 |
| 4,536,078 A | * | 8/1985 | Ziehm | 399/364 |
| 4,607,948 A | * | 8/1986 | Naito | 399/364 |
| 5,809,392 A | * | 9/1998 | Tabuchi et al. | 399/364 |
| 6,397,023 B1 | * | 5/2002 | Underwood et al. | 399/82 |

* cited by examiner

*Primary Examiner*—Fred Braun
(74) *Attorney, Agent, or Firm*—Rossi & Associates

(57) ABSTRACT

There is provided a double-sided printing device that can eliminate a user having to care about the orientation of double-sided recording sheets when such recording sheets are set. A type of a recording sheet to be fed from a feed cassette is designated. An obverse surface image and a reverse surface image are printed, respectively, on the obverse surface and the reverse surface of the recording sheet in a predetermined order. The predetermined order is reversed when the designated type of the recording sheet matches a predetermined type of recording sheet.

59 Claims, 9 Drawing Sheets

DOUBLE-SIDED PRINTING DEVICE AND METHOD, IMAGE FORMING APPARATUS AND CONTROL METHOD THEREFOR, AND STORAGE MEDIUM

BACKGROUND OF THE INVENTION

1. Field of the Invention

The present invention relates to a double-sided printing device and method, an image forming apparatus and a control method therefor, and a storage medium, and more particularly, a double-sided printing device and method which can perform double sided printing on a sheet, as well as an image forming apparatus incorporating the double-sided printing device and a control method therefor, and a storage medium containing a program for implementing the control method.

2. Description of the Related Art

In recent years, among image forming apparatuses such as copying machines, a copying machine having a printed recording sheet discharge outlet inside the housing of an image output device thereof has been developed to minimize the space occupied by the machine when it is installed.

Digital copying machines have come to additionally possess a printer function to serve as an output device for computers, and when this printer function as an output device for computers is performed, a printed recording sheet is discharged with the output side surface facing downward (output face-down sheet discharge). On the other hand, conventional copying machines perform discharge of a printed recording sheet with the output side surface facing upward (output face-up sheet discharge). In a copying machine that has a sheet discharge outlet inside the housing of an image output device thereof, although it is desirable that an inverted discharge unit be connected for switching between output face-down sheet discharge and output face-up sheet discharge so that both output face-down sheet discharge and output face-up sheet discharge are implemented, this is difficult to realize because of the occupied space.

If double-sided printing of recording sheets is performed by incorporating a double-sided printing device into an image forming apparatus capable of performing output face-down sheet discharge alone as described above, the sheets can be printed in proper order by first printing on the reverse surface, and then printing on the front or obverse surface, and discharging the printed recording sheet through output face-down sheet discharge.

However, there is a problem that, when a double-sided sheet, such as preprinted paper, is printed on the both surfaces by a double-sided printing device, if the sheet is set with an obverse surface thereof facing upward to be printed on one side surface thereof, the reverse surface image is printed on the obverse surface of the recording sheet.

SUMMARY OF THE INVENTION

It is an object of the present invention to provide a double-sided printing device and method that can eliminate a user having to care about the orientation of double-sided recording sheets when such recording sheets are set, as well as an image forming apparatus incorporating the double-sided printing device and a control method therefor, and a storage medium containing a program for implementing the control method.

To attain the above object, in a first aspect of the present invention, there is provided a double-sided printing device comprising at least one feed cassette, designating means for designating a type of a recording sheet to be fed from the feed cassette, the recording sheet having an obverse surface and a reverse surface, and printing means for printing an obverse surface image and a reverse surface image respectively on the obverse surface and the reverse surface of the recording sheet in a predetermined order, wherein the printing means reverses the predetermined order when the designated type of the recording sheet matches a predetermined type of recording sheet.

To attain the above object, the first aspect of the present invention also provides a double-sided printing method comprising the steps of designating a type of a recording sheet to be fed from at least one feed cassette of a double-sided printing device, and printing an obverse surface image and a reverse surface image respectively on the obverse surface and the reverse surface of the recording sheet in a predetermined order, wherein when the designated type of recording sheet matches a predetermined type of recording sheet, the predetermined order is reversed in the printing step.

According to the present invention, since a predetermined order in which an obverse surface image and a reverse surface image are printed, respectively, on the obverse surface and reverse surface of a recording sheet is reversed when a designated sheet type matches with a predetermined sheet type, the obverse surface image can be printed on the obverse surface of the recording sheet without fail, regardless of whether it is single-sided printing or double-sided printing, by setting a double-sided recording sheet with the obverse surface facing downward, thereby eliminating a user having to care about the orientation of a recording sheet when a double-sided recording sheet is set.

Preferably, the predetermined order is first the reverse surface and then the obverse surface.

Preferably, the printing means comprises disabling means for disabling printing on the obverse surface of the recording sheet.

More preferably, the printing means further comprises speed changing means operable when the disabling means disables printing on the obverse surface of the recording sheet, for increasing a conveyance speed of the recording sheet.

Also preferably the double-sided printing device comprises a fixing section having a heater, and wherein the printing means further comprises turning-off means operable when the disabling means disables printing on the obverse surface of the recording sheet, for turning off the heater of the fixing section.

Preferably, the at least one feed cassette comprises a plurality of feed cassettes for feeding respective different types of recording sheets including the predetermined type of recording sheet, and wherein the double-sided printing device comprises selecting means for selecting a feed cassette from the plurality of feed cassettes, and the selecting means does not select a feed cassette which feeds the predetermined type of recording sheet.

Typically, the recording sheet comprises at least one type of recording sheet selected from the group consisting of plain paper, recycled paper, thick paper, mother print paper, OHP paper, colored paper, prepunched paper, preprinted paper, letterhead, and label paper, and the predetermined type of recording sheet comprises at least one type of recording sheet selected from the group consisting of prepunched paper, preprinted paper, letterhead, and label paper.

Advantageously, the double-sided printing device is incorporated in a digital copying machine.

To attain the above object, in a second aspect of the present invention, there is provided an image forming apparatus capable of performing a double-sided printing process for printing a (2N−1)-th page image and a 2N-th page image of a print job of a plurality of pages on a first surface and a second surface of a sheet, comprising control means for controlling a double-sided printing mode operation to be executed such that the 2N-th page image is printed on the second surface of the sheet and the (2N−1)-th page image is printed on the first surface of the sheet.

Preferably, the control means controls the double-sided printing mode operation and a second double-sided printing mode operation different from the double-sided printing mode operation to be selectively executed.

More preferably, the second double-sided printing mode operation is executed such that the 2N-th page image is printed on the first surface of the sheet and the (2N−1)-th page image is printed on the second surface of the sheet.

Preferably, the control means determines which of the double-sided printing mode operation and the second double-sided printing mode operation is to be executed, based on a type of the sheet on which images of the print job are to be printed.

Specifically, it is preferable that the control means provides control such that when the type of the sheet on which images of the print job are to be printed is a predetermined type, the double-sided printing mode operation is executed, and when the type of the sheet on which images of the print job are to be printed is a type other than the predetermined type, the second double-sided printing mode operation is executed.

Typically, the type other than the predetermined type includes plain paper.

Preferably, the predetermined type includes at least one of prepunched paper and preprinted paper.

To attain the above object, the second aspect of the present invention also provides a method of controlling an image forming apparatus capable of performing a double-sided printing process for printing a (2N−1)-th page image and a 2N-th page image of a print job of a plurality of pages on a first surface and a second surface of a sheet, comprising a control step of controlling a double-sided printing mode operation to be executed such that the 2N-th page image is printed on the second surface of the sheet and the (2N−1)-th page image is printed on the first surface of the sheet.

To attain the above object, the second aspect of the present invention also provides a computer-readable storage medium storing a program for causing an image forming apparatus capable of performing a double-sided printing process for printing a (2N−1)-th page image and a 2N-th page image of a print job of a plurality of pages on a first surface and a second surface of a sheet to execute a control step of controlling a double-sided printing mode operation to be executed such that the 2N-th page image is printed on the second surface of the sheet and the (2N−1)-th page image is printed on the first surface of the sheet.

The above and other objects, features, and advantages of the invention will become more apparent from the following detailed description taken in connection with the accompanying with drawings.

BRIEF DESCRIPTION OF THE DRAWINGS

FIGS. 7A to 7C are views showing how image data written in the storage area of FIG. 5 are read out, in which:

FIG. 7A shows a case where the image data is rotated by 90 degrees clockwise;

FIG. 7B shows a case where the image data is not rotated; and

FIG. 7C shows a case where two different image data are combined;

DETAILED DESCRIPTION OF THE PREFERRED EMBODIMENTS

The present invention will now be described in detail below with reference to the accompanying drawings showing a preferred embodiment thereof.

Figure 1:
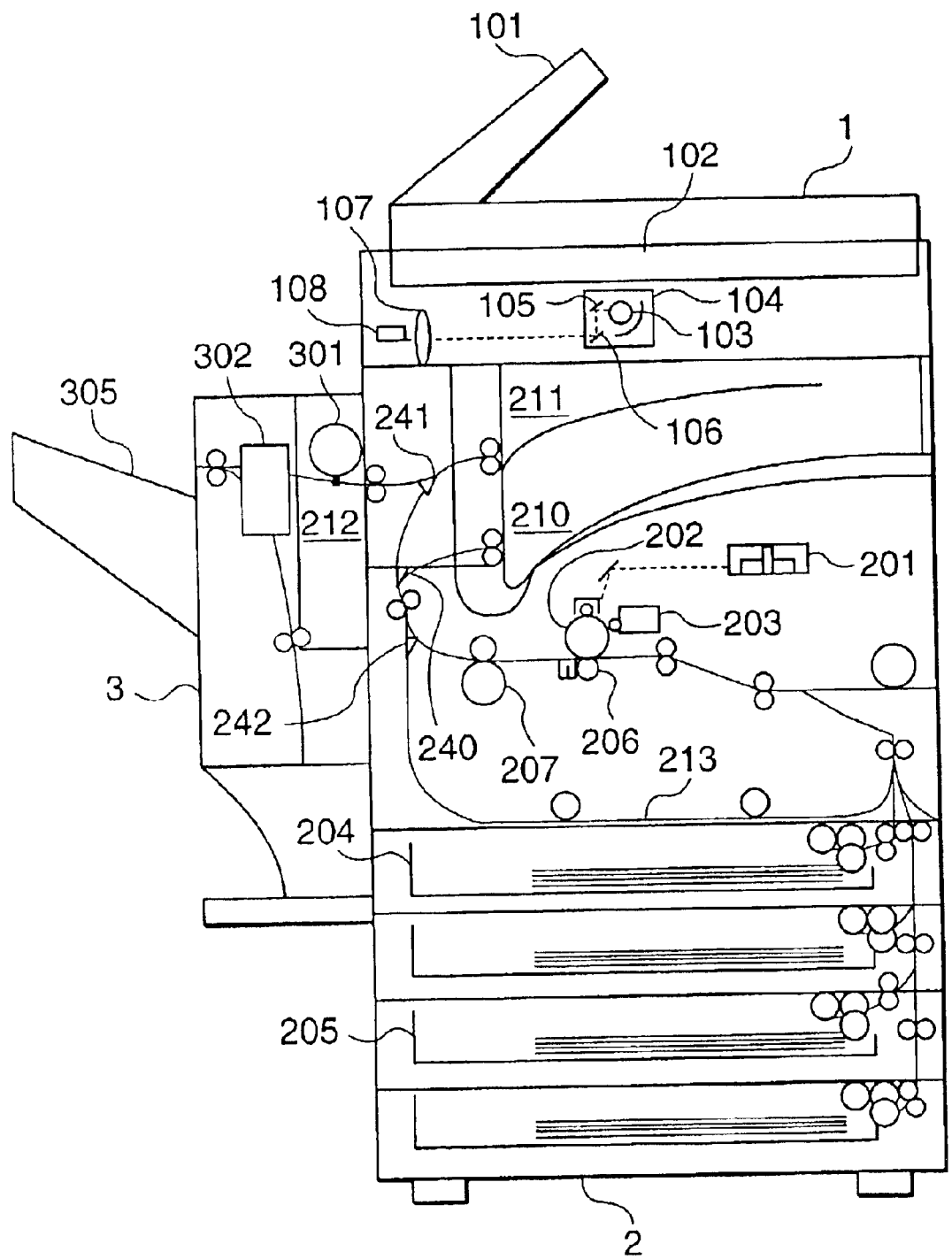
FIG. 1 is a schematic view showing the construction of an image forming apparatus into which a double-sided printing device according to an embodiment of the present invention is incorporated.

FIG. 1 is a schematic view showing the construction of an image forming apparatus in which a double-sided printing device according to an embodiment of the present invention is incorporated.

The image forming apparatus according to the present embodiment is a digital copying machine, which includes a reader section 1, and a printer section 2.

In the reader section 1, originals stacked on an original feeding device 101 are sequentially conveyed sheet by sheet onto a glass surface 102 of an original stand. When each original is placed in position on the glass surface 102, a lamp 103 of a scanner section turns on and a scanner unit 104 moves to irradiate the original. The reflected light from the original is input through mirrors 105 and 106 and a lens 107 to a CCD image sensor unit (hereinafter referred to as "CCD") 108.

An image signal input to the printer section 2 is converted into an optical signal through modulation by an exposure control unit 201 to irradiate a photosensitive body 202. A latent image formed on the photosensitive body 202 by the irradiated light is developed by a developing device 203. In timing with an end of the resulting developed image, a recording sheet is conveyed from a sheet stack section 204 or 205, and the developed image is transferred to the recording sheet by a transfer section 206. After the transferred image is fixed onto the recording sheet by a fixing section 207, the sheet is discharged to any selected one of sheet discharge sections 210, 211 and 212. In the case where the sheet is discharged to the sheet discharge section 210, the sheet discharge to the sheet discharge section 210 is carried out by tilting a sheet discharge section control member 240 in a direction opposite to the sheet discharge section 210. Likewise, In the case where the sheet is discharged to the sheet discharge section 211, the sheet is allowed to pass through the sheet discharge section 211 by tilting a sheet discharge section control member 241 in a direction opposite to the sheet discharge section 211. On this occasion, the sheet is discharged with its printed side surface facing down, i.e., output face-down sheet discharge takes place. In the case where the sheet is discharged to the sheet discharge section 212, the sheet is conveyed toward the sheet discharge section 211 by tilting the sheet discharge section control member 240 in a direction toward the sheet discharge section 210. When the sheet reaches the sheet discharge section 211, its reverse surface faces downward. If the direction of movement of the image transferred sheet is reversed after the sheet discharge section control member 241 has been controlled to be in a horizontal position. By transporting the sheet as it is, the sheet can be discharged with its reverse surface facing downward to the sheet discharge section 212. The recording sheet output from the sheet discharge section 212 is passed to a finisher 3, where the sheet goes through a punch unit 301 to be punched if a punching function is activated, and then is passed to a stapler 302 to be stapled if necessary. After passing through the stapler, the sheet is taken out onto a sheet discharge tray 305.

The image forming apparatus according to the present embodiment has another input section, in addition to the reader section 1, which receives image data from an external computer, not shown, and also has a printer function of printing the image data from the external computer.

The printer section 2 in FIG. 1 includes a double-sided printing device, which, as described below, first print a reverse surface image and next an obverse surface image on a recording sheet, and discharges the sheet with the obverse surface image output side surface (image-formed surface) facing downward, i.e. performs output face-down sheet discharge when recording sheets are set with obverse surfaces (first surfaces) thereof facing downward in the sheet stack sections 204 and 205.

More specifically, the double-sided printing device waits until it is determined that two or more originals required for starting double-sided printing are stacked, and starts double-sided printing when it has been determined that two or more originals are present.

If recording sheets, which are set with first surfaces (obverse surfaces) facing downward in any sheet feeding section (e.g. recording sheet stack section 204, 205) as mentioned above, are fed from the sheet feeding section toward the transfer section 206 of the printer section 2, the sheets are turned upside down through a conveyance path so that they reach the transfer section 206 with their first surfaces (obverse surfaces) facing upward.

Then, if, for double-sided printing or the like, the sheets once passing through the printer section (transfer section 206) are conveyed through an inversion unit (including a conveying direction switching member 242 and a refeeding recorded sheet stack section 213) to again reach the printer section (transfer section 206), the sheets thus again conveyed to the printer section (transfer section 206) have their second surfaces (reverse surfaces) facing upward since the sheets were turned upside down by the inversion unit.

Thus, when a sheet is conveyed from a sheet feeding section to the transfer section 206, the first surface (obverse surface) of the sheet faces upward, and this first surface is printed. If the sheet once conveyed to the transfer section 206 is passed through the transfer section 206 without being printed and passed through the above-mentioned stack section 213 and again conveyed to the transfer section 206, the second surface (reverse surface) of the sheet faces upward and printed. By thus controlling feeding of the sheet, double-sided printing is executed.

Further, in the present embodiment, as described later, double-sided printing of an ordinary type of sheets such as plain paper is carried out in the following manner.

For example, a job of 6 pages of input originals is processed in a first double-sided printing mode (first double-sided printing sequence):

(1) A first recording sheet is conveyed from the sheet feeding section to the transfer section 206, where a second page image is printed on the first surface (obverse surface) of the recording sheet;

(2) A first page image is printed on the second surface (reverse surface) of the above first recording sheet passed through the inversion unit (conveying direction switching member 242 and the refeeding recorded sheet stack section 213) and again conveyed to the transfer section 206 (to thereby complete double-sided printing on the first recording sheet);

(3) A second recording sheet is conveyed from the sheet feeding section to the transfer section 206, where a fourth page image is printed on the first surface (obverse surface) of the second recording sheet;

(4) A third page image is printed on the second surface of the above second recording sheet passed through the inversion unit and again conveyed to the transfer section 206 (to thereby complete double-sided printing on the second recording sheet);

(5) A third recording sheet is conveyed from the sheet feeding section to the transfer section 206, where a sixth page image is printed on the first surface (obverse surface) of the third recording sheet; and (6) A fifth page image is printed on the second surface (reverse surface) of the above third recording sheet passed through the inversion unit and again conveyed to the transfer section 206 (to thereby complete double-sided printing on the third recording sheet).

The recording sheets are discharged through output face-down sheet discharge after completion of double-sided printing and stacked with the odd page surfaces (first, third and fifth page surfaces) facing downward in the sheet discharge section.

In this way, the present embodiment has a first double-sided printing mode (first double-sided printing sequence) in which the printer is operated such that a 2N-th page image (in the above example, a second, fourth or sixth page image) is formed on the first surface (obverse surface) of a sheet, and a (2N−1)-th page image (in the above example, a first, third or fifth page image) is formed on the second surface (reverse surface) of the sheet.

The present embodiment has a second double-sided printing mode (second double-sided printing sequence) in addition to the above described first double-sided printing mode (first double-sided printing sequence). The operation in the second double-sided printing mode is as follows, for example:

First, a recording sheet is passed through the double-sided printing device of the printer section 2 once without being printed, the sheet is turned upside down through the inversion unit (the conveying direction switching member 242 and the refeeding recorded sheet stack section 213), then the sheet is again conveyed to the transfer section 206 to have its second surface become a surface to be printed, and then a second original (second surface), i.e. a second page original image (2N-th page image) is printed on the second surface of the sheet.

Then, after the recording sheet fixed by the fixing section 207 is once conveyed to the sheet discharge section 210, the direction of conveyance of the sheet is reversed, and the sheet is conveyed through the conveying direction switching member 242 to the refeeding printed sheet stack section 213 to have the first surface become a printing surface. When printing for the next original has been prepared, the original image is read in the same way as the above described process, but the recording sheet is fed from the refeeding recorded sheet stack section 213 to the transfer section 206 to have the first surface (obverse surface) become a printing surface, and the image for first surface, i.e. first page ((2N−1)-th) image is printed on the obverse surface (first surface) of the sheet. Eventually, double-sided printing can be carried out in proper order by sequentially outputting two page original images (second surface image (2N-th page image) and first surface image ((2N−1)-th page image) in this order on the reverse (second surface) and obverse surface (first surface) of a recording sheet, and discharging the recording sheet through output face-down sheet discharge to the sheet discharge section 210, 211 or 212. By executing the second double-sided printing mode (second double-sided printing sequence), the following operation is carried out, for example, in the case where a job of six pages of input originals is processed in the second double-sided printing mode:

(1) A first recording sheet is conveyed from the sheet feeding section to the transfer section 206 and passed through the transfer section 206 without being printed, and conveyed to the inversion unit to be turned upside down. Then, the first sheet is again conveyed to the transfer section 206, where a second page image is printed on the second surface (reverse surface) of the first recording sheet which faces upward;

(2) The first recording sheet is turned upside down through the inversion unit and again conveyed to the transfer section 206, where a first page image is printed on the first surface (obverse surface) of the first recording sheet (to thereby complete double-sided printing on the first recording sheet);

(3) A second recording sheet is conveyed from the sheet feeding section to the transfer section 206 and passed through the transfer section 206 without being printed, and conveyed to the inversion unit to be turned upside down. Then, the second sheet is again conveyed to the transfer section 206, where a fourth page image is printed on the second surface (reverse surface) of the second recording sheet which faces upward;

(4) The second recording sheet is turned upside down through the inversion unit and again conveyed to the transfer section 206, where a third page image is printed on the first surface (obverse surface) of the second recording sheet (to thereby complete double-sided printing on the second recording sheet)

(5) A third recording sheet is conveyed from the sheet feeding section to the transfer section 206 and passed through the transfer section 206 without being printed, and conveyed to the inversion unit to be turned upside down. Then, the third sheet is again conveyed to the transfer section 206, where a sixth page image is printed on the second surface (reverse surface) of the third recording sheet which faces upward; and (6) The third recording sheet is turned upside down through the inversion unit and again conveyed to the transfer section 206, where a fifth page image is printed on the first surface (obverse surface) of the third recording sheet (to thereby complete double-sided printing on the third recording sheet).

In this way, according to the present embodiment, a second double-sided printing mode is provided in which the printer is operated such that a 2N-th page image (in the above example, a second, fourth or sixth page image) is formed on the second surface (reverse surface) of a sheet, and a (2N−1)-th page image (in the above example, a first, third or fifth page image) is formed on the first surface (obverse surface) of the sheet.

Thus, the present embodiment has two kinds of double-sided printing mode (double-sided sequence). The two modes are selectively executed according to determined conditions as described later.

Figure 2:
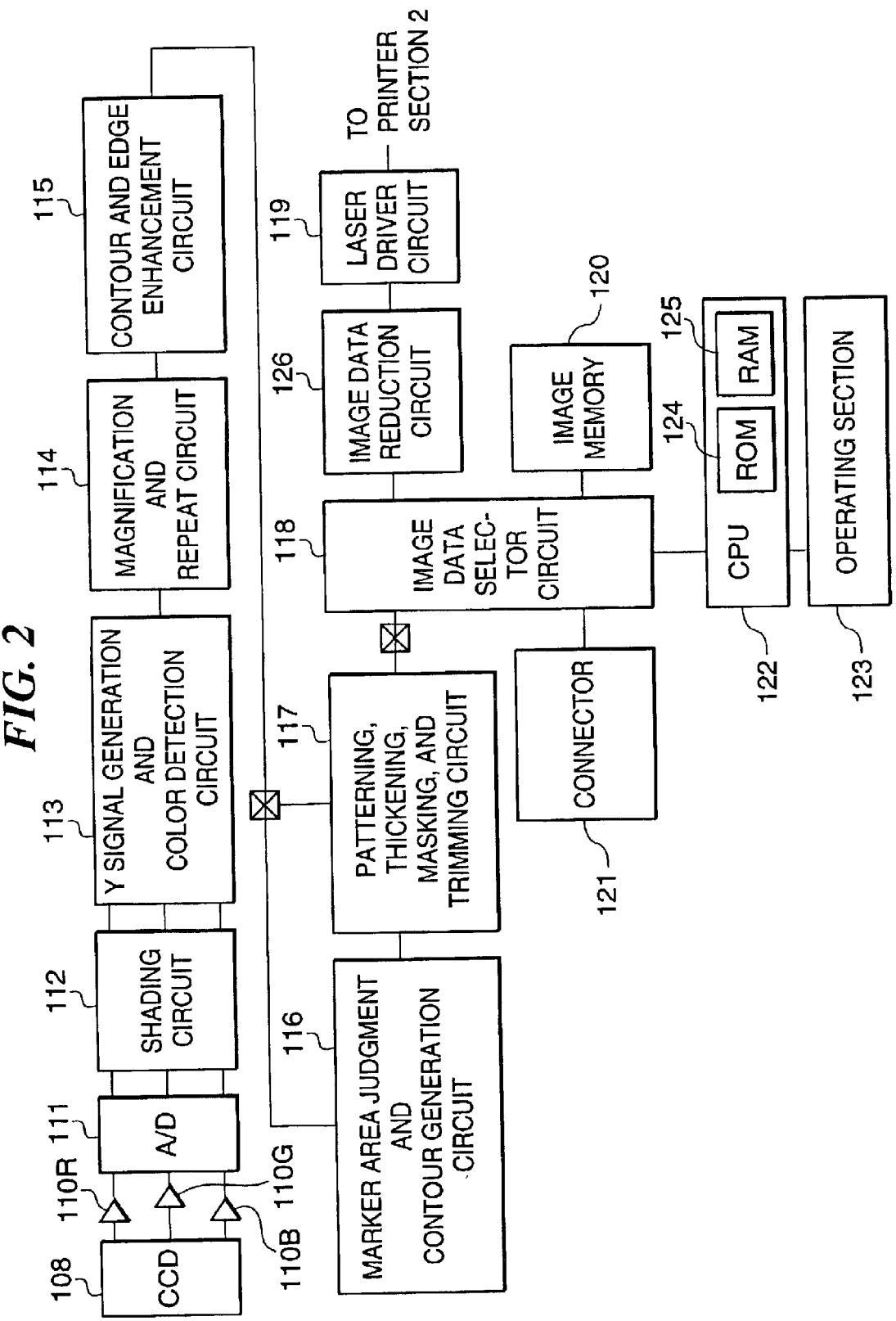
FIG. 2 is a block diagram showing the arrangement of a reader section 1 appearing in FIG. 1.

FIG. 2 is a block diagram of the arrangement of the reader section 1 in FIG. 1.

Light reflected from an original irradiated by the CCD 108 is subjected to photoelectric conversion whereby the reflected light is converted into red, green, and blue electric signals. Color information from the CCD 108 is then amplified by amplifiers 110R, 110G, and 110B to a level matching the input signal level of an A/D converter 111. An output signal from the A/D converter is input to a shading circuit 112, where unevenness in luminous intensity distribution of the lamp 103 and sensitivity of the CCD 108 is corrected. A signal from the shading circuit 112 is input to a Y signal generation and color detection circuit 113. The Y signal generation and color detection circuit 113 generates a Y signal by calculating the signal from the shading circuit 112 using the following expression, separates the R, G, and B signals further into seven colors, and outputs signals corresponding to these colors:

$$Y=0.3R+0.6G+0.1B$$

An output signal from the Y signal generation and color detection circuit 113 is input to a magnification and repeat circuit 114, wherein magnification power in a sub scanning direction is varied according to the scanning speed of the scanner unit 104, and magnification power in a main scanning direction is varied by the magnification and repeat circuit 114. The magnification and repeat circuit 114 also enables a plurality of copies of the same image to be output. A contour and edge enhancement circuit 115 obtains edge enhancement and contour information by enhancing high-frequency components of a signal from the magnification and repeat circuit 114. A signal from the contour and edge enhancement circuit 115 is input to a marker area judgment and contour generation circuit 116 and a patternizing, thickening, masking and trimming circuit 117.

The marker area judgment and contour circuit 116 reads a part of the original written with a marker pen in a designated color and generates the contour information of the marker. The patternizing, thickening, masking and trimming circuit 117 carries out thickening, masking and trimming based on the contour information, and further carries out patternizing based on a detected color signal from the Y signal generation and color detection circuit 113.

An output signal from the patternizing, thickening, masking and trimming circuit 117 is selected by an image data selector circuit 118, input through an image data reduction circuit 125 to a laser driver circuit 119, where the variously processed signal is converted into a signal for driving laser.

An output signal from the laser driver circuit 119 is input to the printer section 2 to be formed into a visible image.

An image memory 120 stores and reads image data sent from the image data selector circuit 118 in and from a designated location of the image memory 120 according to the instructions of a CPU 122 in a manner described later, to thereby perform image rotation processing and image synthesis processing.

The CPU 122 controls the reader section 1 and includes a ROM 124 storing a control program, an error processing program, and so on, a RAM 125 used as a work area for various kinds of programs, and various timer control sections.

An operating section 123 has a group of various keys for giving instructions for image editing contents and image operations such as the number of copies relating to the image processing performed by the reader section 1, and a display section that displays operation contents.

Figure 3:
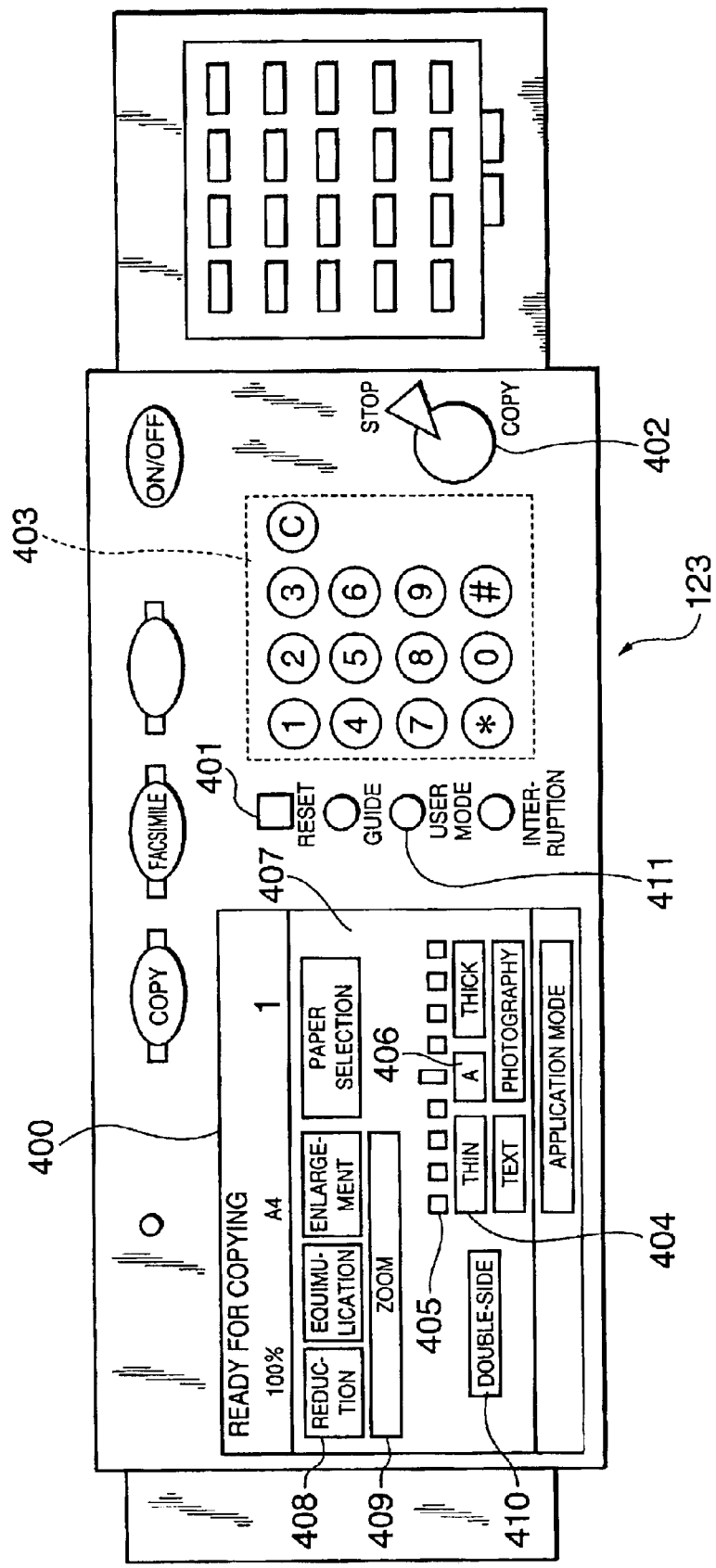
FIG. 3 is a view showing the layout of an operating section 123 appearing in FIG. 2.

FIG. 3 is a view showing the layout of the operating section 123 in FIG. 2.

In FIG. 3, a variety of keys and a liquid crystal display (hereinafter referred to as LCD) section 400 having a dot matrix display made of a LCD unit are disposed in the operating section 123.

The LCD section 400 displays the status of the apparatus, the number of copies, magnifying power, selected paper, and various operating screens and is operated through control keys and the like.

A start key 402 is used to start copying and a reset key 401 is used to return the setting mode to normal setting. A group of keys 403 include a ten-key pad comprised of numerical buttons "0" to "9" for inputting the number of copies and magnification, and a clear key for clearing the input from the ten-key. A density key 404 is used to adjust the level of desired copy density, which is displayed on a display section 405. A key 406 is used to turn ON/OFF an automatic density adjustment function and display its status. A key 407 is used to select a feed cassette or automatic paper selection function and the selection by the key 407 is indicated on the LCD section 400. A key 408 is used to set 100% magnification, regular size reduction or enlargement, and a key 409 is used to set an automatic magnification/reduction (zoom) mode, and the selections of the keys 408 and 409 are also indicated on the LCD section 400. A key 410 is used to designate double-sided printing.

A key 411 is a user mode key which enables a user to make arbitrary setting, and paper type setting in FIG. 8, described later, is implemented by pressing this key 411.

A method of storing and reading image data executed by the reader section 1 in FIG. 1 will be described below with reference to the drawings.

Figure 4:
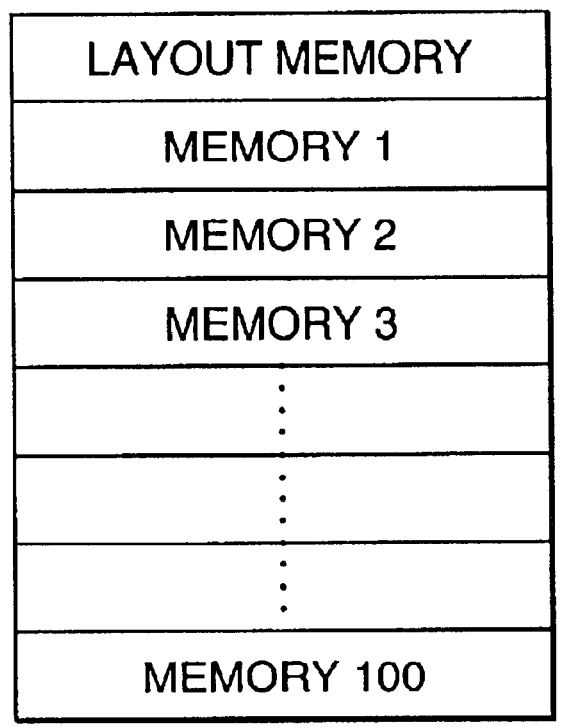
FIG. 4 is a view showing the format of an image storage area of an image memory 120 appearing in FIG. 2.

FIG. 4 is a view showing the format of an image storage area of the image memory 120 in FIG. 2.

In FIG. 4, the image memory 120 has a layout memory in its image storage area, which includes memories 1 to 100. Each storage area of the memories 1 to 100 is formed of 4661 (X direction)×6596 (Y direction) bits as shown in FIG. 5 and is capable of storing image data for an A3-size original.

Figure 5:
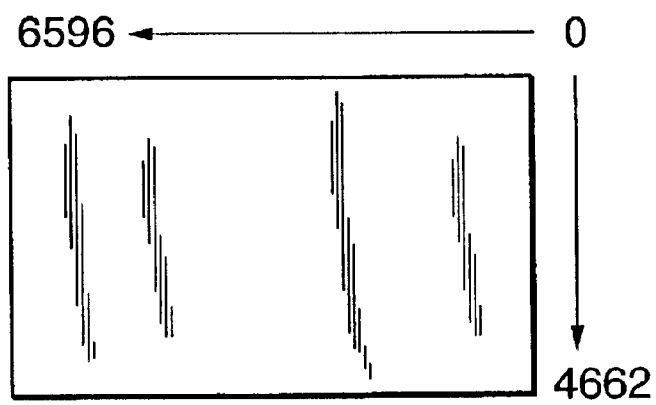
FIG. 5 is a view useful in explaining how an image is stored and read.
Figure 6:
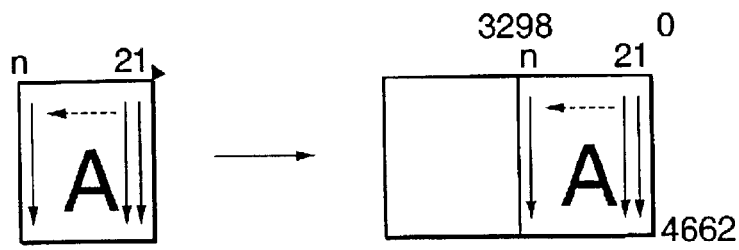
FIG. 6 is a view useful in explaining, by way of example, how a storage area in FIG. 5 is used.

FIG. 6 is a view useful in explaining, by way of example, how a storage area in FIG. 5 is used.

In FIG. 6, image data for an A4-size original is sequentially read in directions indicated by the arrows shown in the figure. First, when the first line starts to be read, an address (0, 0) is assigned as a starting position and a counter for the X direction (X counter) and a counter for the Y direction (Y counter) are set to count up. As the first line is read, the Y counter is counted up or incremented and the data is sequentially written toward an address (0, 4661). Next, when the second line starts to be read, the X counter is incremented by one, and the data is sequentially written from an address (1, 0) toward address (1, 4661). Next, when the third line starts to be read, the X counter is incremented by one, and the data is written from an address (2, 0) to an address (2, 4661). In this way, the reading of the original and writing of the data are repeatedly carried out up to an address (3297, 4661).

Figure 7A:
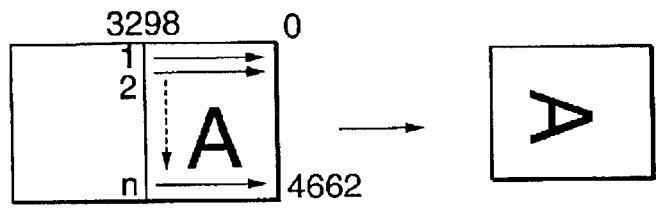
Figure 7B:
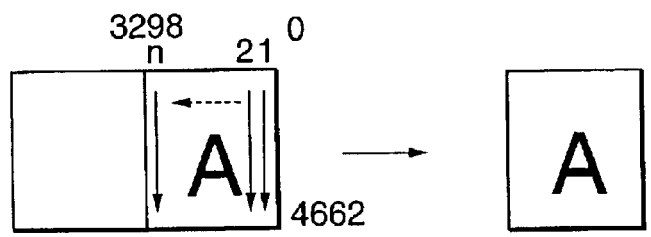
Figure 7C:
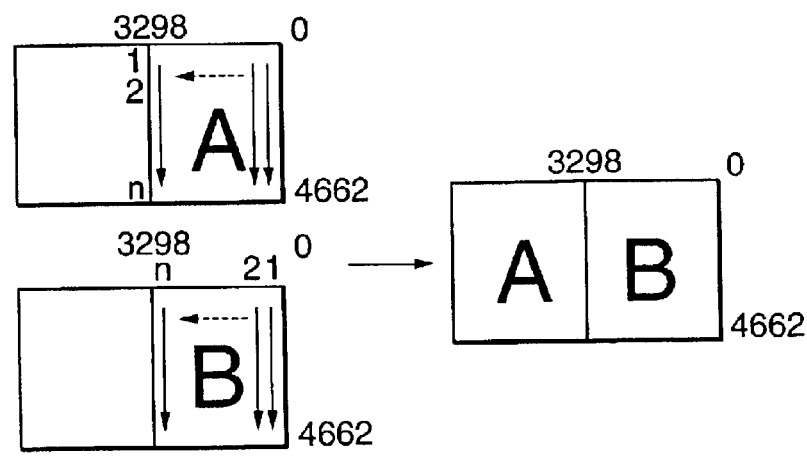

FIGS. 7A to 7C are views showing how image data written in the storage area of FIG. 5 are read out.

In FIG. 7A, the first line of the image data written in the storage area starts to be read out from an address (3297, 0) as a starting position by setting the X counter to count down and the Y counter to count up, and as the first line is read out toward an address (0, 0), the X counter is sequentially decremented. Next, the Y counter is incremented by one and the second line is read out from an address (3297, 1) toward an address (0, 1). By sequentially reading out in this way, the image data can be read out such that the image is clockwise rotated by 90 degrees.

In FIG. 7B, the first line of the image data written in the storage area starts to be read out from the address (0, 0) as a starting position by setting both the X counter and the Y counter to count up, and as the first line is read out toward an address (0, 4661), the Y counter is sequentially incremented. Next, the X counter is incremented by one, and the second line is read out from an address (1, 0) toward an address (1, 4661). By sequentially reading out in this way, the image data can be read out without being rotated.

In FIG. 7C, different original images can be combined on the image layout memory by reading image data written in two different storage areas respectively in the same manner as described above with reference to FIG. 7B and writing the image data in the image layout memory at desired locations.

FIGS. 8A to 8F are views showing how to set types of paper. FIGS. 8A to 8F show operating screens in respective steps, which are displayed on a display panel of the operating section. The following description on a process of setting (registering) paper type is mainly carried out by the operating section of the printer section. However, the present invention is not limited to this, but, a printer driver may be used, which is controlled to carry out a process of setting the type of paper for the printer section through a display section of a remote host computer.

Figure 8A:
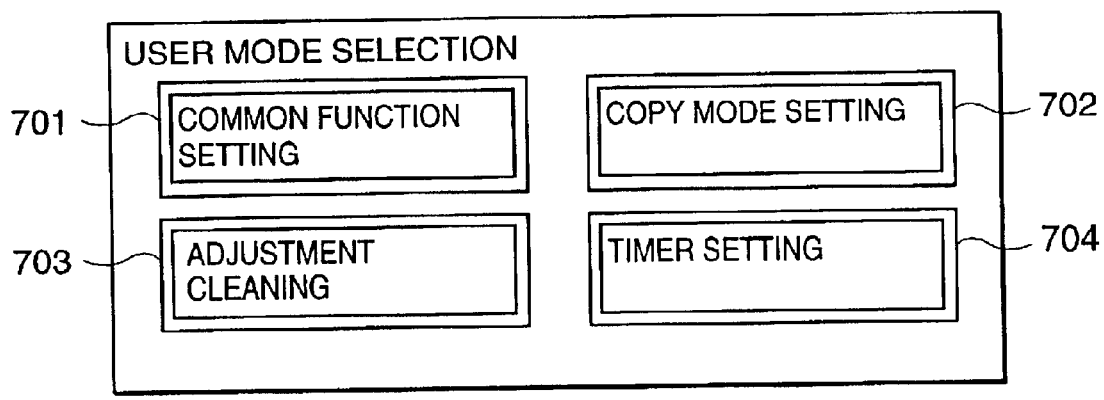
FIGS. 8A to 8F are views showing how to set types of paper, showing operating screens in respective steps.
Figure 8B:
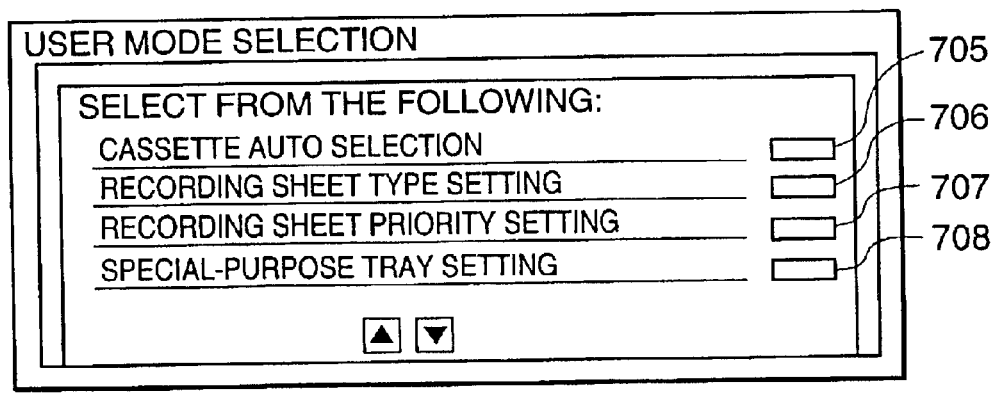
Figure 8C:
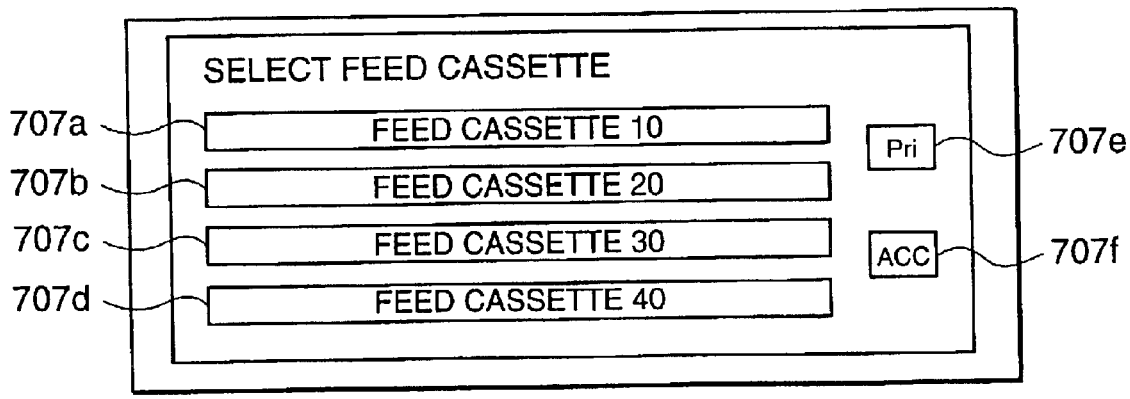

The following description with reference to FIGS. 8A to 8C is based upon the assumption that feed cassettes 10, 20, 30 and 40 stores recording sheets of B4-size, A4-size, A4-size, and A4-size, respectively. These feed cassettes correspond to the four sheet feeding sections (including the recording sheet stack sections 204 and 205) in FIG. 1.

If the user mode key 411 on the operating section in FIG. 3 is depressed by the user, an operating screen shown in FIG. 8A is displayed on the display panel.

In the operating screen in FIG. 8A, a key 701 is a common function setting key for setting common functions for the machine operation; a key 702 is a copy mode setting key for setting copying functions such as automatic rotation ON/OFF; a key 703 is an adjustment cleaning key for setting zoom adjustment and the like; and a key 704 is a timer setting key for setting date and time by pressing this key.

Figure 8D:
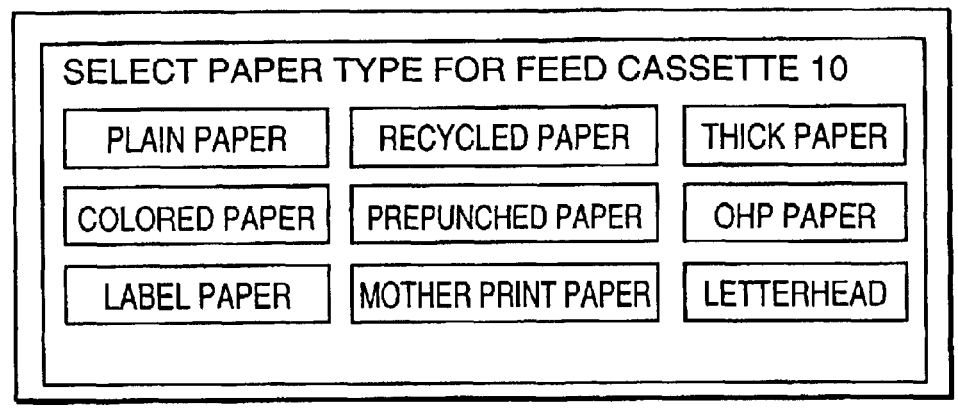

If the key 701 is depressed on the screen of FIG. 8A by the user, an operating screen shown in FIG. 8B is displayed on the display panel. A key 706 on this operating screen is used to set a paper type and pressing this key causes an operating screen shown in FIG. 8C to be displayed on the display panel. By pressing any of button switches 707a to 707d on this screen, an operating screen in FIG. 8D is displayed. The paper type for a selected one of the feed cassettes 10 to 40 can be set through the FIG. 8D screen. On the FIG. 8C screen, which of the feed cassettes has its paper type to be set is selected by a corresponding one of the button switches 707a to 707d. For example, if the button switch 707a is depressed, the paper type for the feed cassette 10 is set on the FIG. 8D screen. In the illustrated example, it is assumed that the feed cassette 10 is set to plain paper by selecting "Plain Paper" on the FIG. 8D screen. Likewise, a paper type is set for each of the other feed cassettes such that the feed cassette 20 is set to colored paper, the feed cassette 30 is set to recycled paper, and the feed cassette 40 is set to plain paper.

Figure 8E:
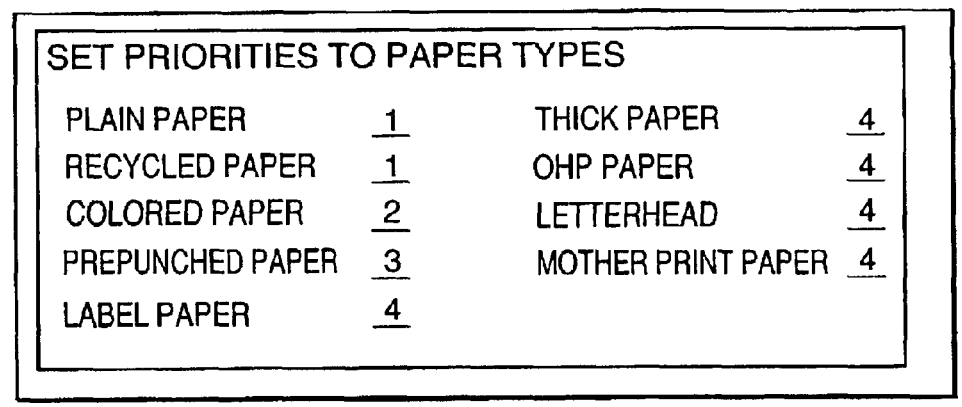
Figure 8F:
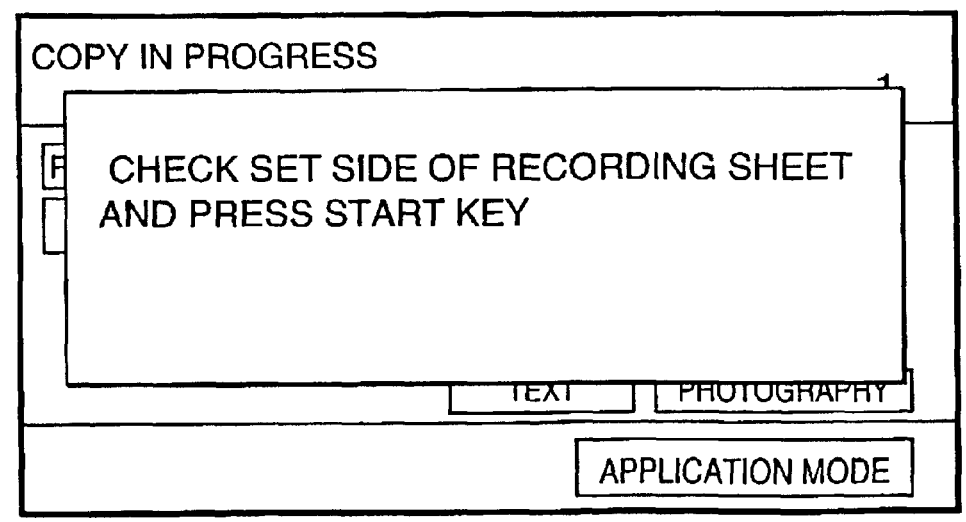

It should be noted that in the present embodiment, the paper type is not limited to the above-mentioned types, but various types of paper can be handled, including predetermined types of paper of which the obverse surface and reverse surface chave prescribed particular orientations, such as prepunched paper (a sheet which is punched in advance), preprinted paper (a sheet having a predetermined image or images printed at a predetermined location or locations, such as a sheet with a logo mark), letterhead, and label paper, and these types of paper can be registered as paper types for feed cassettes through instructions by the user on the FIG. 8D screen. A button-switch 707e is used to set priorities to paper types. If this button is depressed, a screen in FIG. 8E is displayed. On this screen, priorities can be set to the paper types in automatic sheet feeding selection for recording sheets accommodated in sheet feeding sections having paper types set to feed cassettes thereof through the FIG. 8D screen. It is assumed that the priorities are set from the ten-key pad such that 1st is for plain paper, 2nd is for recycled paper, 3rd is for colored paper, and 4th is for thick paper. Accordingly, paper types are selected in the order of plain paper, recycled paper, colored paper, and thick paper during execution of an automatic sheet feeding selection function for printing. A button-switch 707f is used to change a feed cassette, as described later, when the feed cassette is out of recording sheets, for example. When the above settings are completed, a screen in FIG. 8F is displayed.

As is learned from the above described settings, in the present embodiment, as settings of papers, "paper size setting" and "paper type setting" are managed in a manner separate from each other, and different types of paper, even if they have the same size (A4 size plain paper and A4 size recycled paper), are handled as separate media, and printing control is carried out in different manners according to paper size, paper type and both of them.

Figure 9:
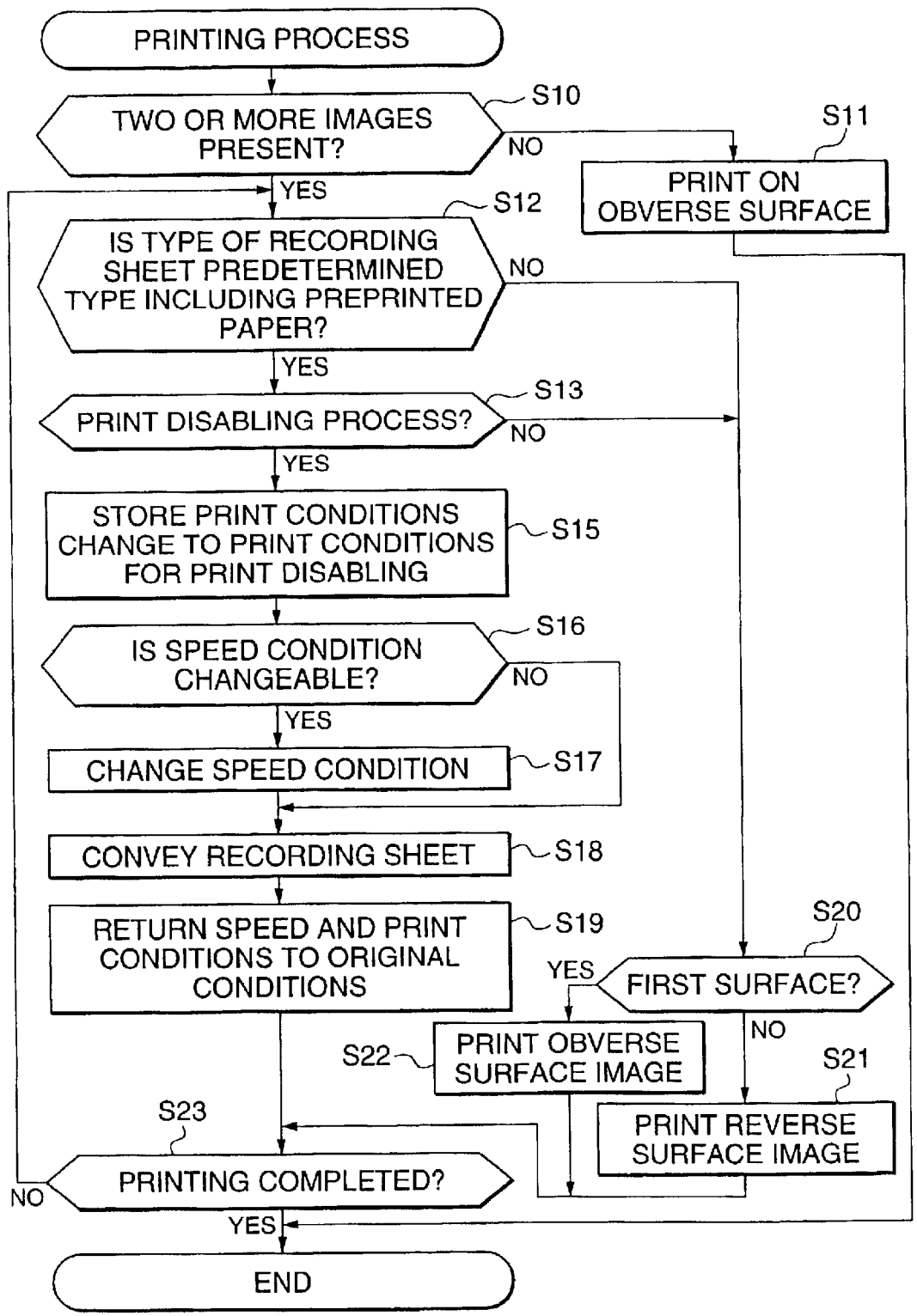
FIG. 9 is a flow chart showing a double-sided printing process executed by the double-sided printing device according to the embodiment.

FIG. 9 is a flow chart showing a double-sided printing process executed by the double-sided printing device according to the present embodiment. This process is executed by the CPU 122 in response to a print request input through an input section (the reader section 1 or a receiver section, not shown, that receives data from an external computer), by reading program data for execution of the FIG. 9 process, stored in the ROM 124.

The double-sided printing device in the printer section 2 of FIG. 1 operates when recording sheets are set with their obverse surfaces (first surfaces) facing downward in the sheet feeding section (including the sheet stack sections 204 and 205) by the user, to first print on the reverse surface, then print on the obverse surface of the recording sheet in the double-sided printing mode, and discharge the printed sheet with the reverse surface as the output surface facing downward on which an odd page ((2N−1)-th page) image (1st, 3rd, 5th, . . . page image). Thus, double-sided printing results with page images being printed in proper order are obtained.

In FIG. 9, first, it is determined whether or not there is image data to be printed for two or more sheets (two or more surfaces) (step S10). Control is provided such that the image data to be printed is stored in the image memory 120 via the input section (the reader section 1 or the receiving section that receives image data from the external computer), and thus the image memory 120 is referred to for the above determination. If, as a result of the determination in step S10, there is image data for a single side only (single-sided printing), even though double-sided printing has been designated and irrespective of the type of recording sheet which has been selected, the printing process is executed on the obverse surface (first surface) of the recording sheet fed from the sheet feeding section (step S11) without executing a print disabling process (a process in steps S15 to S19, etc.). described later, and the process is terminated.

On the other hand, if it is determined in step S10 that there is image data for two or more sides (two or more pages), the double-sided printing is made possible, and then it is determined whether or not the paper type designated for feeding is a predetermined type of paper other than plain paper, such as preprinted paper, prepunched paper, letterhead, and label paper (step S12).

Preprinted paper is a type of paper which has a print or preprints on its surface or surfaces. It should be noted that the type of recording sheet to be printed is determined based on print request data or print setting data based on instructions from the user input according to printing image data, or the like. For the process of determining whether or not the type of sheet to be used is the predetermined type of paper in step S12, sheet management data on paper types set through the above FIG. 8D operating screen and registered on a management memory (e.g. RAM 125) or the above print setting data or the like is used. Which type of paper should be the predetermined type of paper may be determined using manager setting such as service man mode setting. For example, mother print paper and thin paper may be the predetermined type of paper.

If it is determined in step S12 that printing is to be made on the predetermined type of paper, double-sided printing control is provided such that an obverse surface image ((2N−1)-th page image) is printed on the obverse surface (first surface) of the recording sheet, and a reverse surface image (2N-th page image) on the reverse surface (second surface) of the recording sheet (that is, control is provided such that the above-mentioned second double-sided printing sequence is executed).

If it is determined in step S12 that the type of the recording sheet is the predetermined type of paper such as preprinted paper, the second double-sided printing mode (second double-sided printing sequence) is executed. More specifically, the recording sheet is first turned upside down or reversed by once passing the sheet from the sheet feeding section through the double-sided printing device of the printer section 2 without being printed (printing is disabled) (that is, the recording sheet with the first surface facing upward, which has been fed from the sheet feeding section to the transfer section 206, is passed, as it is, through the transfer section 206 without being printed, and turned upside down through the units 242 and 213, and then the sheet is again conveyed with its second surface facing upward to the transfer section 206). In this print disabling process (that is, when the recording sheet passed through the transfer section 206 without being printed is again conveyed to the transfer section 206), the printing conditions such as paper conveyance speed and ON state of the fixing section heater at this point are recorded, and the printing conditions are changed to conditions for print disabling (step S15).

The reasons for changing the printing conditions when printing is disabled are as follows.

When printing is disabled, the paper conveyance speed is increased so that the overall printing time can be shortened. However, because mother print paper and like paper are very thin, and hence, if the conveyance speed is increased, troubles such as jamming and corner folding are likely to occur. Therefore, the conveyance speed is not increased when mother print paper or like paper is processed.

Further, in the case where the fixing section in the printer section 2 is adapted to carry out fixing by utilizing heat, as is well known, a recording sheet is reduced by approximately 0.03% if heat is applied to the recording sheet in this fixing section. In this case, because the sheet is reduced in the fixing section by a 0.03% in the non-printing process, by 0.03% in the obverse surface and by 0.03% in the reverse surface, an extra 0.03% reduction is caused in the non-printing process. Accordingly, when printing is not performed, the extra reduction of a recording sheet can be avoided by turning off a heater (not shown) of the fixing section.

Because of the above reasons, it is determined whether or not the determined predetermined type of paper including preprinted paper is such paper as necessitates changing the conveyance speed. Unlike mother print paper, preprinted paper is paper that necessitates changing the predetermined conveyance speed (YES in step S16). Thus, the conveyance speed is increased and the heater of the fixing section is turned off (step S17), and then the sheet is conveyed (step S18). When the sheet reaches a waiting position of the double-sided printing device (the location of the stack section 213 as the inversion unit), the speed conditions such as the conveyance speed and the printing conditions such as ON/OFF state of the heater of the fixing section are reset to the original conditions to carry out the next printing (step S19), and then, if the printing has been completed (YES in step S23), the process is terminated, and if not (NO in step S23), the process from step S13 is repeated. The above described print disabling process in steps S15 to S19 is not again carried out on a recording sheet once subjected to this print disabling process, and the process jumps from the step S13 to a step S20. In this way, the print disabling process is carried out once for each sheet of a plurality of the predetermined type of sheets in timing in which the sheet is fed from the sheet feeding section to the transfer section 206.

The above described processing is repeated until all the pages of the input originals are read out. That is, if the answer to the determination of step S12 is YES, the above described double-sided printing mode operation (second double-sided printing sequence) is carried out for a job of a plurality of input pages.

If, as a result of the determination in step S13, the recording sheet is passed through the double-sided printing device for the second time or subsequent time (that is, the print disabling process has already been executed on one recording sheet) (NO in step S13), first, as printing for the second surface (NO in step S20), the reverse surface image (2N-th page image) is printed on the second surface of the recording sheet again conveyed to the transfer section 206 with the second surface facing upward after the print disabling process (step S21), and then as printing for the first surface (YES in step S21), the obverse surface image ((2N-1)-th page image) is printed on the first surface of the recording sheet again conveyed to the transfer section 206 with the first surface facing upward through the inversion unit (step S22). After that, if the printing has been completed (YES in step S23), the process is terminated.

If it is determined in step S12 that the type of the recording sheet is not the predetermined type including preprinted paper, i.e., plain paper for example, the print disabling process (executed when YES in step S13) is not executed, and as printing for the second surface (NO in step S20) the reverse surface image (2N-th page image) is printed on the first surface of the recording sheet conveyed to the transfer section 206 with the first surface facing upward from the sheet feeding section (step S21), and then as printing for the first surface (YES in step S21), the obverse surface image ((2N-1)-th page image) is printed on the second surface of the recording sheet again conveyed to the transfer section 206 with the second surface facing upward through the inversion unit (step S22).

Figure 10:
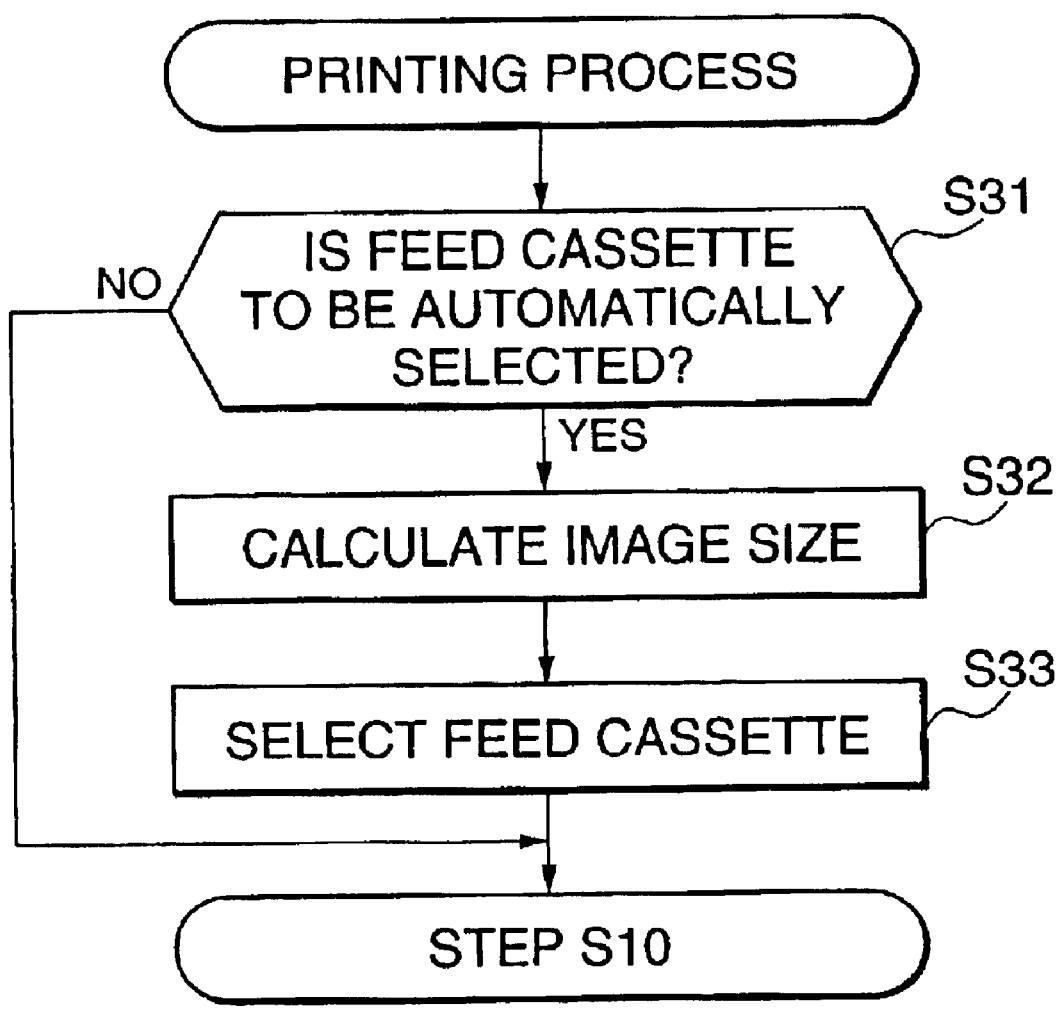
FIG. 10 is a flow chart showing a modification of the double-sided printing process in FIG. 9.

FIG. 10 is a flow chart showing a modification of the double-sided printing process in FIG. 9.

In this modification, the printer section 2 has four feed cassettes 10, 20, 30, and 40, and a feed cassette to be used is selected by a feed cassette selecting means. It is assumed that there are sheets of A4-sized preprinted paper in the feed cassette 10; B4-sized plain paper in the feed cassette 20; A3 sized recycled paper in the feed cassette 30; and A4-sized plain paper in the feed cassette 40.

In FIG. 10, first, it is determined in step S31 whether or not the feed cassette is to be automatically selected, and if it is not to be automatically selected, after the feed cassette has been manually selected, the process in FIG. 9 is executed.

If it is determined in step S31 that the feed cassette is to be automatically selected, after the size of an image to be output has been calculated (step S32) and the optimum feed cassette to the calculated image size has been selected (step S33), the process in FIG. 9 is executed.

In step S33, if the size of the image to be output is, for example, 7015 pixels in the main scanning direction and 4960 pixels in the sub scanning direction, and hence can be recorded on an A4-sized recording sheet (7015 pixels×4960 pixels), the feed cassette 10 or 40 is selected. In this case, since preprinted paper is stored in the feed cassette 10 and plain paper is stored in the feed cassette 40 and preprinted paper takes more time because it has to go through the print disabling process when double-sided printing is performed, the feed cassette 40 containing plain paper is selected.

According to the above described embodiment and modification, by setting double-sided recording sheets with obverse surfaces thereof facing downward in the sheet stack sections 204 and 205, an obverse surface image can be printed on the obverse surface of a recording sheet without fail regardless of whether it is single-sided printing or double-sided printing, the user's concern about the orientation of paper can be eliminated when double-sided recording sheets are set.

Although a print disabling process (YES in step 13) is executed in the above embodiment and modification, instead of executing the print disabling process, a warning message may be issued, indicating, for example, "Check the set side of the recording sheet and press the start key," when double-sided printing on a predetermined type of paper including preprinted paper is selected, and then the user is instructed to set the predetermined type of recording sheet or sheets with the first surface or surfaces facing not downward but upward in the sheet feeding section and the sheet or sheets are processed through the second double-sided printing sequence.

Although in the above embodiment and modification, an image forming apparatus incorporating a double-sided printing device has been taken as an example, the present invention is not limited to this, but may be applied to another image forming apparatus to which a double-sided printing device of any type can be connected.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the storage medium on which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD–RW, a DVD+RW, a magnetic tape, a nonvolatile memory card, and a ROM.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

Although in the above described embodiment, the electrophotographic printing using laser beam is adopted as the printing method by the printing mechanism, there is no intention to limit the present invention to this. For example, the present invention may be applied to a variety of printing methods such as LED printing, thermal transfer printing, and ink-jet printing.

What is claimed is:

1. A double-sided printing device comprising:
   at least one feed cassette;
   designating means for designating a type of a recording sheet to be fed from said feed cassette, said recording sheet having an obverse surface and a reverse surface; and
   printing means for printing an obverse surface image and a reverse surface image respectively on the obverse surface and the reverse surface of the recording sheet in a predetermined order;
   wherein said printing means reverses the predetermined order when the designated type of the recording sheet matches a predetermined type of recording sheet.

2. A double-sided printing device as claimed in claim 1, wherein the predetermined order is first the reverse surface and then the obverse surface.

3. A double-sided printing device as claimed in claim 1 or 2, wherein said printing means comprises disabling means for disabling printing on the obverse surface of the recording sheet.

4. A double-sided printing device as claimed in claim 3, wherein said printing means further comprises speed changing means operable when said disabling means disables printing on the obverse surface of the recording sheet, for increasing a conveyance speed of the recording sheet.

5. A double-sided printing device as claimed in claim 3, comprising a fixing section having a heater, and wherein said printing means further comprises turning-off means operable when said disabling means disables printing on the obverse surface of the recording sheet, for turning off the heater of said fixing section.

6. A double-sided printing device as claimed in claim 1, wherein said at least one feed cassette comprises a plurality of feed cassettes for feeding respective different types of recording sheets including the predetermined type of recording sheet, and wherein the double-sided printing device comprises selecting means for selecting a feed cassette from the plurality of feed cassettes, and said selecting means does not select a feed cassette which feeds the predetermined type of recording sheet.

7. A double-sided printing device as claimed in claim 1, wherein the recording sheet comprises at least one type of recording sheet selected from the group consisting of plain paper, recycled paper, thick paper, mother print paper, OHP paper, colored paper, prepunched paper, preprinted paper, letterhead, and label paper, and the predetermined type of recording sheet comprises at least one type of recording sheet selected from the group consisting of prepunched paper, preprinted paper, letterhead, and label paper.

8. A double-sided printing device as claimed in claim 1, which is incorporated in a digital copying machine.

9. A double-sided printing method comprising the steps of:
   designating a type of a recording sheet to be fed from at least one feed cassette of a double-sided printing device; and
   printing an obverse surface image and a reverse surface image respectively on the obverse surface and the reverse surface of the recording sheet in a predetermined order;
   wherein when the designated type of recording sheet matches a predetermined type of recording sheet, the predetermined order is reversed in said printing step.

10. A double-sided printing method as claimed in claim 9, wherein the predetermined order is first the reverse surface and then the obverse surface.

11. A double-sided printing method as claimed in claim 9, wherein said printing step includes a step of disabling printing on the obverse surface of the recording sheet.

12. A double-sided printing method as claimed in claim 11, wherein said printing step further comprises a step of increasing a conveyance speed of the recording sheet when said disabling means disables printing on the obverse surface of the recording sheet.

13. A double-sided printing method as claimed in claim 11, wherein the double-sided printing device further comprises a fixing section having a heater, and wherein said printing step further comprises a step of turning off the heater of the fixing section when printing on the obverse surface is disabled in said disabling step.

14. A double-sided printing method as claimed in claim 9, wherein said at least one feed cassette comprises a plurality of feed cassettes for feeding respective different types of recording sheets including the predetermined type of recording sheet, and wherein said double-sided printing method comprises a selecting step of selecting a feed cassette from the plurality of feed cassettes, and a feed cassette which feeds the predetermined type of recording sheet is not selected in said selecting step.

15. A double-sided printing method as claimed in claim 9, wherein the recording sheet comprises at least one type of recording sheet selected from the group consisting of plain paper, recycled paper, thick paper, mother print paper, OHP paper, colored paper, prepunched paper, preprinted paper, letterhead, and label paper, and the predetermined type of recording sheet comprises at least one type of recording sheet selected from the group consisting of prepunched paper, preprinted paper, letterhead, and label paper.

16. A double-sided printing method as claimed in claim 9, wherein the double-sided printing device is incorporated in a digital copying machine.

17. An image forming apparatus capable of performing a double-sided printing process for printing a (2N−1)-th page image and a 2N-th page image of a print job of a plurality of pages on a first surface and a second surface of a sheet, comprising:

control means for controlling a double-sided printing mode operation to be executed such that the 2N-th page image is printed on the second surface of the sheet and the (2N−1)-th page image is printed on the first surface of the sheet, wherein said control means controls the double-sided printing mode operation and a second double-sided printing mode operation different from the double-sided printing mode operation to be selectively executed, and wherein said control means determines which of the double-sided printing mode operation and the second double-sided printing mode operation is to be executed, based on a type of the sheet on which images of the print job are to be printed.

18. An image forming apparatus as claimed in claim 17, wherein the second double-sided printing mode operation is executed such that the 2N-th page image is printed on the first surface of the sheet and the (2N−1)-th page image is printed on the second surface of the sheet.

19. An image forming apparatus as claimed in claim 17, wherein said control means provides control such that when the type of the sheet on which images of the print job are to be printed is a predetermined type, the double-sided printing mode operation is executed, and when the type of the sheet on which images of the print job are to be printed is a type other than the predetermined type, the second double-sided printing mode operation is executed.

20. An image forming apparatus as claimed in claim 19, wherein the type other than the predetermined type includes plain paper.

21. An image forming apparatus as claimed in claim 19, wherein the predetermined type includes at least one of prepunched paper and preprinted paper.

22. A method of controlling an image forming apparatus capable of performing a double-sided printing process for printing a (2N−1)-th page image and a 2N-th page image of a print job of a plurality of pages on a first surface and a second surface of a sheet, comprising:

a control step of controlling a double-sided printing mode operation to be executed such that the 2N-th page image is printed on the second surface of the sheet and the (2N−1)-th page image is printed on the first surface of the sheet, wherein in said control step, the double-sided printing mode operation and a second double-sided printing mode operation different from the double-sided printing mode operation to be selectively executed are controlled, and wherein in said control step, which of the double-sided printing mode operation and the second double-sided printing mode operation is to be executed is determined based on a type of the sheet on which images of the printing job are to be printed.

23. A computer-readable storage medium storing a program for causing an image forming apparatus capable of performing a double-sided printing process for printing a (2N−1)-th page image and a 2N-th page image of a print job of a plurality of pages on a first surface and a second surface of a sheet to execute a control step of controlling a double-sided printing mode operation to be executed such that the 2N-th page image is printed on the second surface of the sheet and the (2N−1)-th page image is printed on the first surface of the sheet, wherein in said control step, the double-sided printing mode operation and a second double-sided printing mode operation different from the double-sided printing mode operation to be selectively executed are controlled, and wherein in said control step, which of the double-sided printing mode operation and the second double-sided printing mode operation is to be executed is determined based on a type of the sheet on which images of the print job are to be printed.

24. A printing device capable of performing a double-sided printing process of a print job of a plurality of pages, comprising:

a memory that stores a plurality of printable data; and a controller that causes the printing device to operate in a first mode in which 2N-th page data of the print job is printed on a first surface of a printing medium used in performing the double-sided printing process and (2N−1)-th page data of the print job is printed on a second surface of the printing medium, when a type of the printing medium used in performing the double-sided printing process is a first type, and causes the printing device to operate in a second mode in which the 2N-th page data of the print job is printed on the second surface of the printing medium and the (2N−1)-th page data of the print job is printed on the first surface of the printing medium, when the type of the printing medium used in performing the double-sided printing process is a second type.

25. A printing device as claimed in claim 24, wherein the second type of the printing medium comprises a printing medium of which an obverse surface and a reverse surface have prescribed particular orientations, and the first type of the printing medium comprises a printing medium of which an obverse surface and a reverse surface do not have prescribed particular orientations.

26. A printing device as claimed in claim 24, wherein the second type of the printing medium comprises a printing medium having additional information printed in advance on at least one of a first surface and a second surface thereof, and the first type of the printing medium comprises a printing medium having no additional information printed in advance on at least one of a first surface and a second surface thereof.

27. A printing device as claimed in claim 24, wherein the first type of the printing medium comprises plain paper, and the second type of the printing medium comprises a printing medium other than plain paper.

28. A printing device as claimed in claim 24, wherein the second type of the printing medium comprises at least one printing medium selected from the group consisting of prepunched paper, preprinted paper, letterhead, and label paper.

29. A printing device as claimed in claim 24, wherein the first type of the printing medium comprises at least one of plain paper and recycled paper.

30. A printing device as claimed in claim 24, wherein said controller causes the printing device to operate so that the (2N−1)-th page data is printed after the 2N-th page data is printed, in both a case where the printing device is operated in the first mode and a case where the printing device is operated in the second mode.

31. A printing device as claimed in claim 24, wherein the printing device comprises a discharge section, and wherein the said controller causes the printing device to operate so that after the (2N−1)-th page data is printed on one surface of the printing medium, the printing medium is discharged to the discharge section of the printing device such that the one surface on which the (2N−1)-th page data is printed faces downward.

32. A printing device as claimed in claim 31, wherein said controller controls a conveying operation for conveying the printing medium, the conveying operation including an operation for turning upside down an obverse surface and a reverse surface of the printing medium.

33. A printing device as claimed in claim 24, wherein said controller causes the printing device to operate in a mode selected from the first mode and the second mode, based on a printing condition set by a user.

34. A printing device as claimed in claim 33, wherein said controller causes the printing device to operate in a mode selected from the first mode and the second mode, based on a type of printing medium set by a user.

35. A printing device as claimed in claim 33, wherein the printing device prints data of a printing job on a printing medium fed by one of a plurality of sources, and wherein said controller causes the printing device to operate in a mode selected from the first mode and the second mode, based on a source selected from the plurality of sources by a user.

36. A printing device as claimed in claim 24, wherein the printing device comprises a scanner unit, and an operating section, and wherein the printing device prints a data of a printing job input from said scanner unit, and said controller causes the printing device to operate in a mode selected from the first mode and the second mode, based on user setting in said operating section of the printing device.

37. A printing device as claimed in claim 24, wherein the printing device prints data of a printing job output from a host computer, and wherein said controller causes the printing device to operate in a mode selected from the first mode and the second mode, based on user setting in an operating section of the host computer.

38. A printing device as claimed in claim 24, wherein said controller controls said memory which stores the (2N−1)-th page data and the 2N-th page data.

39. A printing device as claimed in claim 24, wherein said controller controls the printing device so that a processing speed at which the printing device is operated in the first mode is different from a processing speed at which the printing device is operated in the second mode.

40. A printing device capable of performing a double-sided printing process, comprising:
a memory that stores a plurality of printable data; and
a controller that causes the printing device to operate in a first mode in which at least 2N-th page data of a print job of a plurality of pages is printed on a first surface of a printing medium, when a type of the printing medium is a first type, and causes the printing device to operate in a second mode in which at least the 2N-th page data of the print job is printed on a second surface of the printing medium, when the type of the printing medium is a second type.

41. A method of controlling a printing device capable of performing a double-sided printing process of a print job of a plurality of pages, comprising:
a storing step of storing a plurality of printable data in a memory provided in the printing device; and
a control step of causing the printing device to operate in a first mode in which 2N-th page data of the print job is printed on a first surface of a printing medium used in performing the double-sided printing process and (2N−1)-th page data of the print job is printed on a second surface of the printing medium, when a type of the printing medium used in performing the double-sided printing process is a first type, and causing the printing device to operate in a second mode in which the 2N-th page data of the print job is printed on the second surface of the printing medium and the (2N−1)-th page data of the print job is printed on the first surface of the printing medium, when the type of the printing medium used in performing the double-sided printing process is a second type.

42. A method of controlling the printing device as claimed in claim 41, wherein the second type of the printing medium comprises a printing medium of which an obverse surface and a reverse surface have prescribed particular orientations, and the first type of the printing medium comprises a printing medium of which an obverse surface and a reverse surface do not have prescribed particular orientations.

43. A method of controlling the printing device as claimed in claim 41, wherein the second type of the printing medium comprises a printing medium having additional information printed in advance on at least one of a first surface and a second surface thereof, and the first type of the printing medium comprises a printing medium having no additional information printed in advance on at least one of a first surface and a second surface thereof.

44. A method of controlling the printing device as claimed in claim 41, wherein the first type of the printing medium comprises plain paper, and the second type of the printing medium comprises a printing medium other than plain paper.

45. A method of controlling the printing device as claimed in claim 41, wherein the second type of the printing medium comprises at least one printing medium selected from the group consisting of prepunched paper, preprinted paper, letterhead, and label paper.

46. A method of controlling the printing device as claimed in claim 41, wherein the first type of the printing medium comprises at least one of plain paper and recycled paper.

47. A method of controlling the printing device as claimed in claim 41, wherein in said control step, the printing device is caused to operate so that the (2N−1)-th page data is printed after the 2N-th page data is printed, in both a case where the printing device is operated in the first mode and a case where the printing device is operated in the second mode.

48. A method of controlling the printing device as claimed in claim 41, wherein in said control step, the printing device is caused to operate so that after the (2N−1)-th page data is printed on one surface of the printing medium, the printing medium is discharged to a discharge section of the printing device such that the one surface on which the (2N−1)-th page data is printed faces downward.

49. A method of controlling the printing device as claimed in claim 48, wherein in said control step, a conveying operation for conveying the printing medium is controlled, the conveying operation including an operation for turning upside down an obverse surface and a reverse surface of the printing medium.

50. A method of controlling the printing device as claimed in claim 41, wherein in said control step, the printing device is caused to operate in a mode selected from the first mode and the second mode, based on a printing condition set by a user.

51. A method of controlling the printing device as claimed in claim 50, wherein in said control step, the printing device is caused to operate in a mode selected from the first mode and the second mode, based on a type of printing medium set by a user.

52. A method of controlling the printing device as claimed in claim 50, wherein the printing device prints data of a printing job on a printing medium fed by one of a plurality of sources, and wherein in said control step, the printing device is caused to operate in a mode selected from the first mode and the second mode, based on a source selected from the plurality of sources by a user.

53. A method of controlling the printing device as claimed in claim 41, wherein printing device comprises a scanner unit, and an operating section, and wherein the printing device prints a data of a printing job input from said scanner unit, and in said control step, the printing device is caused to operate in a mode selected from the first mode and the second mode, based on user setting in said operating section of the printing device.

54. A method of controlling the printing device as claimed in claim 41, wherein the printing device prints data of a printing job output from a host computer, and wherein in said control step, the printing device is caused to operate in a mode selected from the first mode and the second mode, based on user setting in an operating section of the host computer.

55. A method of the controlling the printing device as claimed in claim 41, wherein in said control step, said memory which stores the (2N-1)-th page data and the 2N-th page data is controlled.

56. A method of controlling the printing device as claimed in claim 41, wherein said controller controls the printing device so that a processing speed at which the printing device is operated in the first mode is different from a processing speed tat which the printing device is operated in the second mode.

57. A method of controlling a printing device capable of performing a double-sided printing process, comprising:

a storing step of storing a plurality of printable data in a memory provided in the printing device; and a control step of causing the printing device to operate in a first mode in which at least 2N-th page data of a print job of a plurality of pages is printed on a first surface of a printing medium, when a type of the printing medium is a first type, and causing the printing device to operate in a second mode in which at least the 2N-th page data of the print job is printed on a second surface of the printing medium, when the type of the printing medium is a second type.

58. A computer-readable storage medium storing a program for executing a method of controlling a printing device capable of performing a double-sided printing process of a print job of a plurality of pages, the method comprising:

a storing step of storing a plurality of printable data in a memory provided in the printing device; and a control step of causing the printing device to operate in a first mode in which 2N-th page data of the print job is printed on a first surface of a printing medium used in performing the double-sided printing process and (2N-1)-th page data of the print job is printed on a second surface of the printing medium, when a type of the printing medium used in performing the double-sided printing process is a first type, and causing the printing device to operate in a second mode in which the 2N-th page data of the print job is printed on the second surface of the printing medium and the (2N-1)-th page data of the print job is printed on the first surface of the printing medium, when the type of the printing medium used in performing the double-sided printing process is a second type.

59. A computer-readable storage medium storing a program for executing a method of controlling a printing device capable of performing a double-sided printing process of a print job of a plurality of pages, the method comprising:

a storing step of storing a plurality of printable data in a memory provided in the printing device; and a control step of causing the printing device to operate in a first mode in which at least 2N-th page data of a print job of a plurality of pages is printed on a first surface of a printing medium, when a type of the printing medium is a first type, and causing the printing device to operate in a second mode in which at least the 2N-th page data of the print job is printed on a second surface of the printing medium, when the type of the printing medium is a second type.

* * * * *